(12) United States Patent
Kusilek et al.

(10) Patent No.: US 6,354,521 B1
(45) Date of Patent: Mar. 12, 2002

(54) QUICK DISCONNECT AND RELEASE HOSE COUPLINGS

(75) Inventors: Thomas V. Kusilek, River Falls, WI (US); James P. McAuley, Shoreview, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/549,482

(22) Filed: Apr. 14, 2000

(51) Int. Cl.[7] ................................................ B05B 15/00
(52) U.S. Cl. ...................................... 239/600; 285/114
(58) Field of Search ............................ 239/600; 285/114, 285/316

(56) References Cited

U.S. PATENT DOCUMENTS

| | | | |
|---|---|---|---|
| 2,441,363 A | 5/1948 | Krueger | 285/174 |
| 2,511,765 A | 6/1950 | Bradbury | 284/18 |
| 2,765,181 A | 10/1956 | Butterfield | 284/18 |
| 3,386,754 A | * 6/1968 | Morrison | |
| 3,435,848 A | 4/1969 | Johnston | 137/614 |
| 3,680,893 A | * 8/1972 | Giraud | |
| 3,730,221 A | 5/1973 | Vik | 137/614 |
| 3,779,586 A | * 12/1973 | Rossiter | |
| 3,881,753 A | * 5/1975 | Bochory | |
| 4,139,222 A | * 2/1979 | Loland | |
| 4,348,039 A | 9/1982 | Miller | 285/1 |
| 4,451,069 A | 5/1984 | Melone | 285/86 |
| 4,577,833 A | 3/1986 | Bormioli | 251/149 |
| 4,596,263 A | 6/1986 | Snider | 137/68.1 |
| 4,682,795 A | 7/1987 | Rabushka et al. | 285/1 |
| 4,754,780 A | 7/1988 | Smith, III | 137/614 |
| 4,881,573 A | 11/1989 | Durant et al. | 137/614 |
| 5,248,306 A | * 9/1993 | Clark et al. | |
| 5,285,807 A | 2/1994 | Nitzberg | 137/68 |
| 5,305,984 A | 4/1994 | Chen | 251/149.1 |
| 5,379,798 A | 1/1995 | Syljeset et al. | 137/614 |
| 5,445,419 A | 8/1995 | Thuerig | 285/1 |
| 5,507,530 A | 4/1996 | Mahaney | 285/26 |
| 5,816,621 A | 10/1998 | Frost | 285/1 |
| 6,024,824 A | 2/2000 | Krech | 156/279 |
| 6,131,961 A | * 10/2000 | Heilmann | |

FOREIGN PATENT DOCUMENTS

WO    WO 97/03756    2/1997    ............. B05B/7/08

OTHER PUBLICATIONS

"Quick–Disconnect Hose Couplings" Catalogue Pipe Fittings and Pipe, Tubing and Fitting, Hose and Fitting; Online XP002154144 (Retrieved from the Internet: URL:http//www.mcmaster.com/careers/ retrieved on Nov. 29, 2000 p. 188, "NPT Hose Connection").

* cited by examiner

*Primary Examiner*—Lesley D. Morris
(74) *Attorney, Agent, or Firm*—Rudolph P. Hofmann, Jr.

(57) ABSTRACT

A quick disconnect and release hose couplings is disclosed where the socket will disconnect and release from a plug if the hose connected to the hose coupling is pulled with sufficient force. A quick disconnect female socket used in the hose coupling includes a body portion and a movable sleeve. The hose coupling includes an end conduit that is adapted for coupling to a hose. The end conduit is connected to an intermediate conduit, and the intermediate conduit is connected to the body portion of the socket. The hose is in fluid communication with the socket through the end conduit and intermediate conduit. The intermediate conduit also permits the end conduit to move relative to the body portion. A mechanical coupling is attached to the end conduit and to the sleeve of the socket such that when the end conduit moves relative to the body portion the mechanical coupling moves the sleeve relative to the body portion. Accordingly, pulling on the end conduit or the hose attached to the end conduit will retract the sleeve so as to disconnect and release the hose coupling from the plug.

22 Claims, 3 Drawing Sheets

QUICK DISCONNECT AND RELEASE HOSE COUPLINGS

BACKGROUND

Quick disconnect hose coupling assemblies provide reliable and easy connections. Quick disconnect coupling assemblies are ubiquitous and are available from many manufacturers. The parts are generally interchangeable even if made by different manufacturers. The design of the coupling assemblies permits a male plug, also known as a nipple, to quickly mate with a female socket. When the plug is fitted with the socket, hardened pins or balls in the socket engage a groove or ridge on the plug. This locks the assembly in place and provides a generally fluid-tight seal. The assembly is still able to swivel 360 degrees when locked to prevent twisting of the hose. To unlock the assembly, a retractable sleeve is provided on the socket. Retracting the sleeve disengages the pins or balls from the groove or ridge. The socket than can be pulled away from the plug to disengage the assembly. The assembly will not disengage unless the sleeve is retracted.

One illustrative application of quick disconnect hose coupling assemblies is used on pavement markers, i.e., devices that are used to spread paint or film as markings onto pavements or curbs. One common device for applying or reapplying markings known in the art as a "flame sprayer," such as the Green Light GLG-20 brand flame sprayer manufactured by the 3M Company of St. Paul, Minn. The flame sprayer ignites a fuel such as propane to heat a thermal powder sprayed from a nozzle. The thermal powder is thus converted into a "paint" that readily adheres to a pavement surface. An operator rolls the flame sprayer along the pavement as the flame sprayer sprays the pavement. A quick disconnect hose coupling assembly is used to connect the flame-sprayer to a remote air compressor that supplies pressurized air to apply the paint.

One disadvantage of the quick disconnect hose coupling assembly is that the hose, or the apparatus connected to the hose, will become damaged if the hose is pulled without first unlocking the socket from the plug. For example, flame sprayers are often used in the vicinity of traffic. If the hose were to catch on a passing vehicle, the coupling assembly would not disengage. The resulting force on the coupling assembly attached to the flame sprayer would likely first knock over the flame sprayer, causing damage to the flame sprayer and spilling the powder, and then rip the hose from the hose coupling assembly. This is one illustration of many situations where pulling on a hose connected to an engaged assembly will damage the hose or connected apparatus. Accordingly, there is a need in the art for a hose coupling assembly that will reduce the potential for damage and will disengage if the hose is accidentally pulled.

SUMMARY

The present disclosure relates to quick disconnect and release hose couplings where the socket will disconnect and release from a plug if the hose connected to the hose coupling is pulled with sufficient force. Thus, if in the flame sprayer example above, a passing vehicle catches the hose, the hose coupling assembly will release the hose from the flame sprayer. This should reduce the amount of damage to the hose and flame sprayer if they were connected with other types of quick disconnect assemblies.

A suitable quick disconnect female socket used in the hose coupling includes a body portion and a movable sleeve. The hose coupling includes an end conduit that is adapted for coupling to a hose. The end conduit is connected to an intermediate conduit, and the intermediate conduit is connected to the body portion of the socket. The hose is in fluid communication with the socket through the end conduit and intermediate conduit. The intermediate conduit also permits the end conduit to move relative to the body portion. A mechanical coupling is attached to the end conduit and to the sleeve of the socket such that when the end conduit moves relative to the body portion the mechanical coupling moves the sleeve relative to the body portion. Accordingly, pulling on the end conduit or the hose attached to the end conduit will retract the sleeve so as to disconnect and release the hose coupling from the plug.

Several examples of such couplings are disclosed. On example discloses an end fitting that can be attached to the hose, and an intermediate fitting that is attached to the body portion of the socket. The end fitting and intermediate fittings are slidably connected together such that the end fitting is movable relative to the body portion. A mechanical coupling is attached to the end fitting and clamped onto the sleeve. Thus, as the end fitting is pulled away from the body portion, the sleeve retracts on the socket. Other examples are disclosed, along with alternate designs, and still many more versions are contemplated.

DETAILED DESCRIPTION

The disclosure relates to quick disconnect and release hose couplings. The disclosure, including the figures, describes quick disconnect and release hose couplings with reference to a few examples. The scope of the invention is not limited to the few examples, i.e., the described embodiments of the invention. Rather, the scope of the invention is defined by the appended claims. Changes can be made to the examples, including alternative designs not disclosed, and still be within the scope of the claims.

Figure 1:
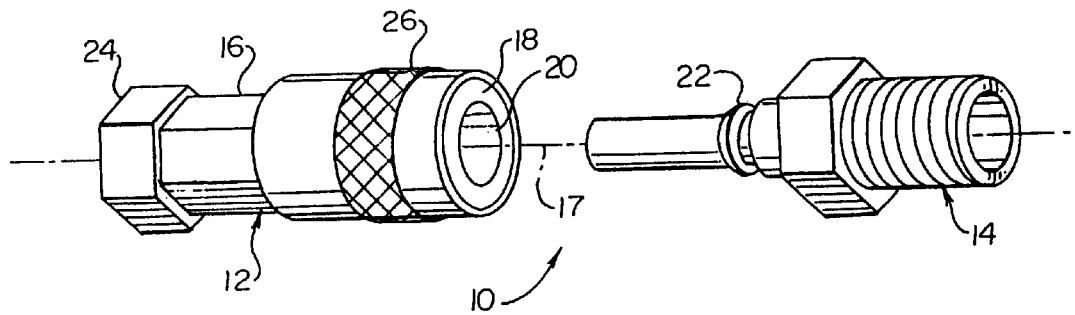
FIG. 1 shows a perspective view of a hose coupling assembly.

FIG. 1 shows a hose coupling assembly 10 where a socket 12, often attached to a first hose, is connected to a plug 14, often attached to a second hose. The socket 12 includes a body portion 16 having a first end 18 that receives the plug 14 such that the plug 14 is inserted into an opening 20 in the first end 18. A locking mechanism typically using pawls or balls disposed within the opening 20 engages the ridge 22 of the plug 14 to lock the socket 12 to the plug 14. In one example, the locked assembly 10 provides a generally air tight seal and permits a fill 360 degree swivel, i.e., the plug 14 can freely rotate relative to the socket 12. The body portion also includes a second end 24, opposite the first end 18, that is adapted to be coupled to a fitting or a hose. The socket 12 includes a sliding sleeve 26 urged toward the first end 18 with an internal spring, or the like. The sliding sleeve 26 actuates the internal locking mechanism. An example of one such assembly 10 is available from McMaster-Carr of Chicago, Ill. The connected assembly 10 permits fluids, i.e., liquids and/or gasses, to pass between the socket 12 and plug 14.

Longitudinal movement of the sleeve 26 of at least a predetermined distance relative to the body portion 16, such as retracting the sliding sleeve 26 from the first end 18, releases the locking mechanism so the body portion 16 can be disconnected from the plug 14. Longitudinal movement or force is movement or force along the direction of the sleeve 26 as it moves relative to body portion 16 to unlock the internal locking mechanism. In the example, the predetermined distance is the distance the sleeve is retracted to release the locking mechanism. In the example shown, longitudinal movement is movement along the axis indicated at 17, and the longitudinal direction is along the direction of axis 17. Once the sleeve 26 is retracted, the socket 12 can be pulled away from the plug 14, or vice versa. Thus, retracting the sleeve 26 permits decoupling or disconnection of the socket 12 from the plug 14. In addition to the force used to retract the sleeve 26, another force in the longitudinal direction on the body portion 16 is used to separate the socket 12 from the plug 14. Often, an operator will tug on the sleeve 26 with sufficient force to retract the sleeve 26 and also disconnect the socket 12. Merely pulling on the body portion 16 without also retracting the sleeve 26 will generally not disconnect the socket 12 from the plug 14 without damage.

Many coupling assemblies are suitable for use in the present invention. Many versions of coupling assembly designs are available for connecting the socket 12 to the plug 14. For example, one design of socket is a type where the sleeve is retracted in order to connect the socket with the plug. Another design is a push-to-connect socket where the plug can be inserted into the socket without having to first retract the sleeve. In order to disconnect, the sleeve is retracted and the socket is pulled from the plug, or vice versa. Various designs and materials can be used for the sockets depending on the application. The design of the socket can be optimized for fluid type, fluid pressure and operating temperature, and so on. In one example, the socket has a shut-off valve disposed within the body that seals the socket when disconnected from the plug. Other examples are contemplated, and many varieties of sockets and plugs are suitable.

Figure 2:
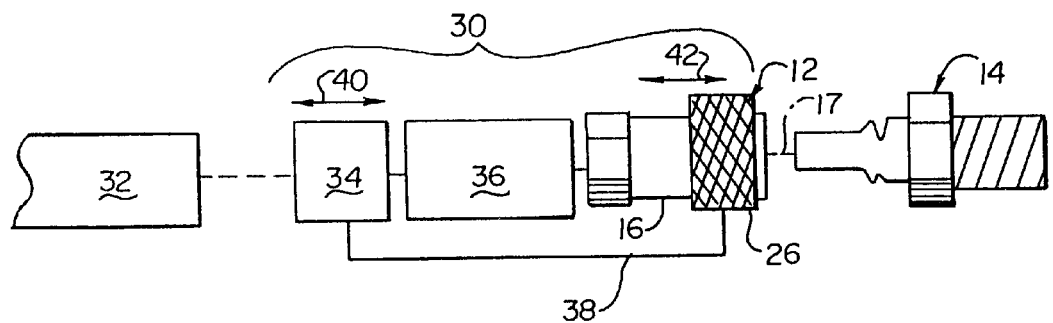
FIG. 2 shows a schematic diagram of the hose coupling of the present disclosure.

FIG. 2 shows a schematic diagram of a hose coupling 30 that includes socket 12 and can be connected to the plug 14. Hose coupling 30 is also adapted to be connected to a hose 32. The hose coupling 30 includes the socket 12, an end conduit 34, an intermediate conduit 36 fluidly coupling the end conduit 34 to the socket 12, and a mechanical coupling 38 connecting the end conduit 34 to the sleeve 26 of the socket 12. The end conduit 34 is adapted for coupling to the hose 32, as indicated. The intermediate conduit 36 is a mechanical connection that, in addition to providing a conduit for fluid to pass through the end conduit 34 to the socket 12, permits the end conduit 34 to move relative to the body portion 16 of the socket 12.

The mechanical coupling 38 connects the end conduit 34 to the sleeve 26 so that longitudinal motion 40 of the end conduit 34 relative to the body portion 16 effects longitudinal motion 42 of the sleeve 26 relative to the body portion 16. If in FIG. 1 a hose were directly coupled to the second end of the body portion 16, merely pulling on the hose would not disconnect the socket from a plug. In the design of FIG. 2, pulling on the end conduit 34 of the hose coupling 30, or pulling on the hose 32 when attached to the end conduit 34, retracts the sleeve 26 and will unlock or disconnect the socket 12 from the plug 14. Thus, pulling the hose 32 with sufficient longitudinal force will quickly disconnect and release the hose coupling 30 from the plug 14.

Figure 3:
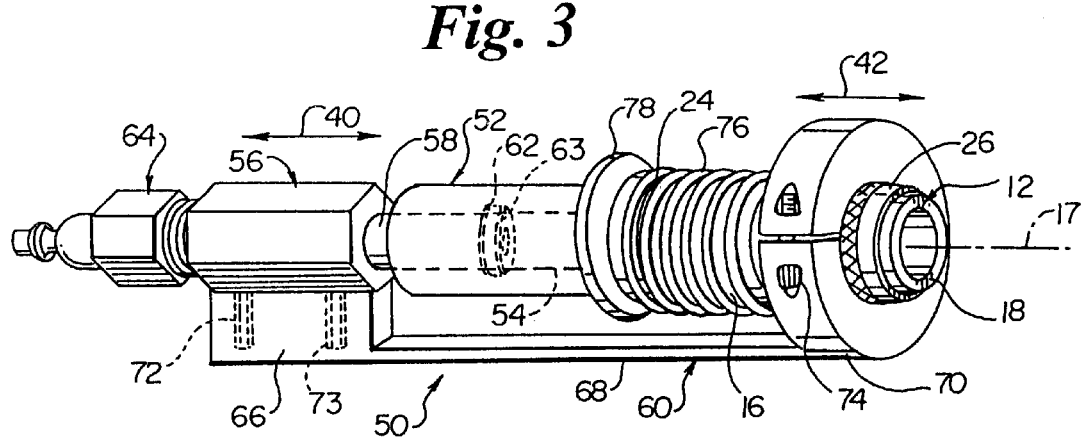
FIG. 3 shows a perspective view of a first example of a hose coupling corresponding to the schematic diagram of FIG. 2.

FIG. 3 shows one example of a hose coupling 50 incorporating the design of hose coupling 30. Hose coupling 50 includes socket 12, female fitting 52, male fitting 56, and bracket 60. The socket 12 is connected to a female fitting 52, which includes a bore 54 shown in phantom. The male fitting 56 includes a section 58 partially shown in phantom inserted into the bore 54. The bracket 60 mechanically connects the male fitting 56 to the sleeve 26 of the socket 12. Various materials depending on the application can be used to construct the coupling 50. In one example, the socket 12, female fitting 52, and male fitting 56 are made of brass and are rigid.

The female fitting 52 generally corresponds with the intermediate conduit 36 of FIG. 2. The female fitting 52 in the example is threaded into the second end 24 of the body portion to form a generally air tight seal. In the example shown, the female fitting 52 is not movable in the longitudinal direction relative to the body portion 16. As indicated, the bore 54 is in fluid communication with the socket 12.

The male fitting 56 with section 58 generally corresponds with the end conduit 34 of FIG. 2. Section 58 is sized to fit within the bore 54 so that male fitting 56 is movable in the longitudinal direction relative to the female fitting 54, and, thereby, the body portion 16 of the socket 12. The male fitting 56 including section 58 is bored and thus is in fluid communication with the female fitting 52 and socket 12. Section 58 slides within bore 54 and, in the example shown, includes O-rings 62, 63 that help form a generally fluid-tight fit between the female fitting 52 and male fitting 56. The male fitting can be attached directly to a hose. In the example shown, the male fitting 56 is connected to a hose fitting 64 that is adapted to be attached to a hose. In an alternate design, the male fitting 56 and female fitting 52 are reversed. The male fitting 56 is coupled to the body portion 16 and generally corresponds with the intermediate conduit 36. The female fitting 52 is adapted to be coupled to a hose and generally corresponds with the end conduit 34. The section 58 of male fitting 56 is inserted into and slides with bore 54.

Bracket 60 generally corresponds with mechanical coupling 38 of FIG. 2. One example of bracket 60 includes block 66, longitudinal member 68, and clamp 70. Block 66 is attached to the male portion with screws 72, 73, shown in phantom. Longitudinal member 68 is integrally formed with block 66 and clamp 70. In one example, the clamp 70 is sized to fit around the sleeve 26 as shown. The clamp 70 is tightened around sleeve 26 with screw 74 so as to connect the clamp 70 to the sleeve 26. The clamp 70, however, is not so tight so as to deform the sleeve 26 such that the sleeve 26 does not move relative to the body portion 16 of the socket 12. In the example, the bracket 60 is rigid and rigidly attached to the male fitting 56 and the sleeve 26 such that the male fitting 54 does not move relative the sleeve 26. Rather, the male fitting 56 moves with the sleeve 26.

A spring 76 is included with the hose coupling 50 for some applications. In some applications, fluid pressure becomes large within the hose coupling 50. The build up of pressure within the socket 12 and the bore 54 of the female fitting 52 and against section 58 urges the male fitting 56 away from the female fitting 52. In other words section 58 acts like a cylinder under pressure within the female fitting 52. If the male fitting 56 is urged far enough away from the female fitting, the sleeve 26 will retract from the first end of the socket 12 and the hose coupling 50 could inadvertently become disconnected from the plug 14. In such applications where the fluid is under high pressure, the spring 76 urges the sleeve 26 toward the first end 18 and counter act the fluid forces acting on section 58. The spring 76 is disposed around the body portion 16 and between spring seat 78 and clamp 70. The spring seat 78 is shown integrally formed with female fitting 52. Alternatively, the spring seat 78 can be attached to the body portion 16 or can be a separate piece such as a washer disposed between the female fitting 52 and body portion 16. The spring 76 can be applied to other examples of hose coupling 30 to counteract any similar forces. Alternatively the internal spring in the socket 12 can be chosen or modified to have sufficient force to overcome the urge of the male fitting 56 to separate from the female fitting 52.

The force of the spring 76 can be chosen depending on the application and the amount of fluid pressure within the female fitting 52. In one example, the spring force is chosen to be less than the force needed to pull the hose away from the male fitting 56. Thus, the sleeve 26 will retract and the socket 12 will disconnect from the plug 14 before the hose is ripped from the male fitting 56.

Figure 4:
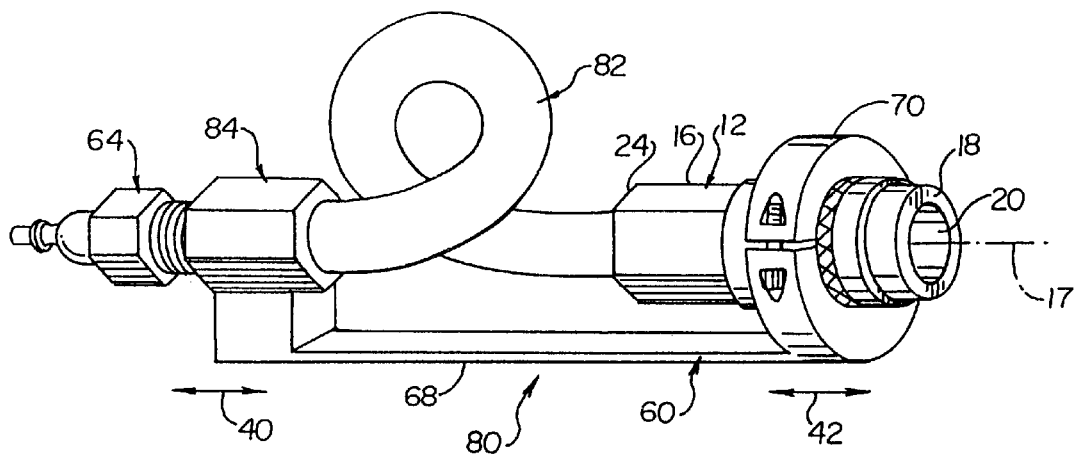
FIG. 4 shows a perspective view of second example of a hose coupling corresponding to the schematic diagram of FIG. 2.

FIG. 4 shows a second example of a hose coupling 80 incorporating the design of the hose coupling 30 of FIG. 2. Elements of hose coupling 80 that are similar to hose coupling 30 and 50 of FIGS. 2 and 3 have like reference numerals in FIG. 4. Hose coupling 80 includes socket 12, flexible tube 82, fitting 84, and bracket 60. The fitting 84 generally corresponds with the end conduit 34 of the hose coupling 30 shown in FIG. 2. Fitting 84 is adapted to be coupled to a hose, either directly, or via hose fitting 64 as shown. The bracket 60 is attached to the fitting 84, for example with a screw. The bracket 60 is also directly attached to the sleeve 26 of the socket 12 in a manner similar to that as described with respect to hose coupling 50 of FIG. 3. The longitudinal member 68 spaces the fitting 84 apart from the socket 12. As described above, the fitting 84 is mechanically coupled to the sleeve 26 such that the fitting 84 and sleeve 26 move together. Longitudinal movement of the fitting 84 corresponds with longitudinal movement of the sleeve 26. That is, if the fitting 84 is pulled away from the body portion 16, the sleeve 26 retracts from the first end 18 of the socket 12.

The flexible tube 82 generally corresponds with the intermediate conduit 36 shown in the hose coupling 30 of FIG. 2. The flexible tube 82 is coupled to the fitting 84. The flexible tube 82 is also coupled to the socket 12 with a fitting (not shown). The flexible tube 82 is long enough to provide slack between the spaced-apart fitting 84 and socket 12. In the example, the flexible tube 82 is pig tailed to provide the slack. The flexible tube 82 provides fluid communication between the fitting 84 and socket 12.

Figure 5:
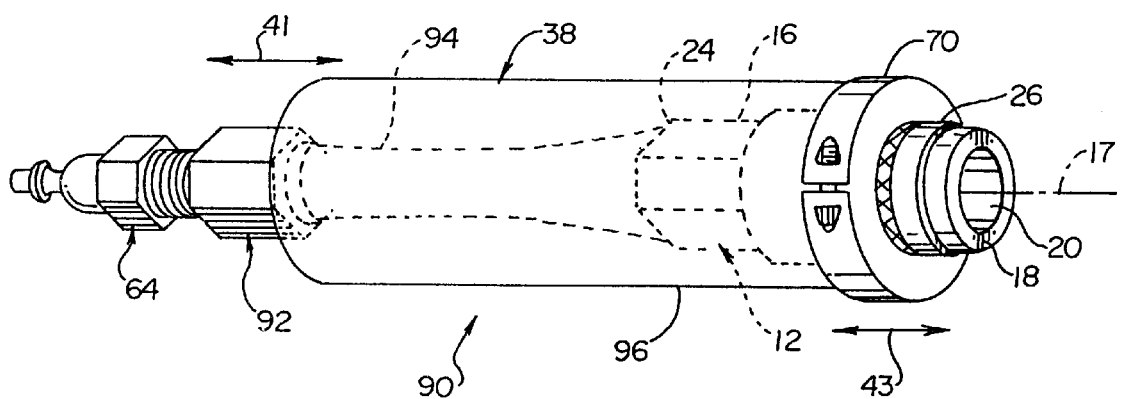
FIG. 5 shows a perspective view of a third example of a hose coupling corresponding to the schematic diagram of FIG. 2.

FIG. 5 shows a third example of a hose coupling 90 incorporating the design of the hose coupling 30 of FIG. 2. Elements of hose coupling 90 that are similar to the hose coupling 30, 50, and 80 of FIGS. 2, 3 or 4 have like reference numerals in FIG. 5. Hose coupling 90 includes fitting 92, flexible tube 94, socket 12, clamp 70, and elongate sleeve 96. The fitting 92 is attached to the flexible tube 94, which is coupled to the body portion 16 of the socket 12. In the example shown, flexible tube 94 is stretchable in at least the longitudinal direction. In one example, the stretchable flexible tube is reinforced to withstand significant bulging due to the internal pressure on the tube. In another example, the stretchable flexible tube is accordion-like. The stretchable flexible tube 94 provides for fluid communication between the fitting 92 and socket 12 even when the fitting 92 is pulled away from the socket 12. Accordingly, the flexible tube 94 generally corresponds with the intermediate conduit 36 of the hose coupling 30 of FIG. 2.

The clamp 70 and elongate sleeve 96 generally correspond with the mechanical coupling 38 of the hose coupling of FIG. 2. As in the examples of FIGS. 3 and 4, the clamp 70 is attached to the sleeve 26. The elongate sleeve 96 is attached to the clamp 70 and to the fitting 92. Alternatively, the elongate sleeve 96 can be replaced with the integrally formed bracket 60 of FIGS. 3 and 4. In the example of FIG. 5, the clamp 70 and elongate sleeve 96 cause the fitting 92 and sleeve 26 to move together. As in the other examples, longitudinal movement of the fitting 92 corresponds with longitudinal movement of the sleeve 26 such that if the fitting 92 is pulled away from the body portion 16, the sleeve 26 retracts from the first end 18 of the socket 12. In one example, the elongate sleeve 96 is rigid.

In another example, the elongate sleeve 96 is somewhat elastic or stretchable. In some examples of this, the stretchable elongate sleeve is less elastic than the flexible tube 94. In this example, the elastic elongate sleeve 96 can bend and twist and the fitting 92 can move relative to the sleeve 26. Thus, movement of the fitting 92 relative to the body portion 16 does not necessarily correspond with the same movement of the sleeve 26. Longitudinal movement 41 of the fitting 92 relative to the body portion 16, however, effects longitudinal movement 43 of the sleeve 26 relative to the body portion 16 even if the sleeve 26 and fitting 92 do not move the same distance. Alternative stretchable mechanical couplings are contemplated, such as stretchable straps, or the like, instead of elongate sleeve 96.

The elastic elongate sleeve 96 has several advantages. For example, when a hose coupled to the fitting 92 is subjected to a component of force instead of or in addition to that in the longitudinal direction, the coupling 90 bends, twist or does both with the hose. In the case where there is also a sufficient force in the longitudinal direction, the socket 12 is disconnected and released from the plug 14. This alleviates strain on the hose at the point where it is attached to the hose coupling 90 such as at the hose fitting 64 or fitting 92 and reduces damage to the hose.

Many examples or combinations of parts are contemplated to make up the hose coupling 30 of FIG. 2. For example, the elongate sleeve 96 can be used instead of the bracket 60. Many different designs of sockets 12 with retractable sleeves can be used in the couplings of the disclosure. Many suitable fittings can be used to attach to tubes and hoses in the couplings 30, 50, 80 and 90. The elongate sleeve 96 or longitudinal member 68 can be directly coupled to the sleeve 26 without clamp 70, such as by fasteners, with a weld, or the like. Additional designs are contemplated.

In the examples where the mechanical coupling 38 is rigid, pulling the end conduit 34 the same distance as the distance the sleeve 16 must retract to unlock the socket 12 will be enough to unlock the assembly. In the examples where the mechanical coupling 38 is elastic or stretchable, the end conduit 34 may need to be pulled a larger distance than the distance the sleeve 16 will need to travel to unlock the socket 12. Thus, the predetermined distance the end conduit 34 must travel in order to unlock the socket 12 will vary on the type of mechanical coupling 38 used.

Figure 6:
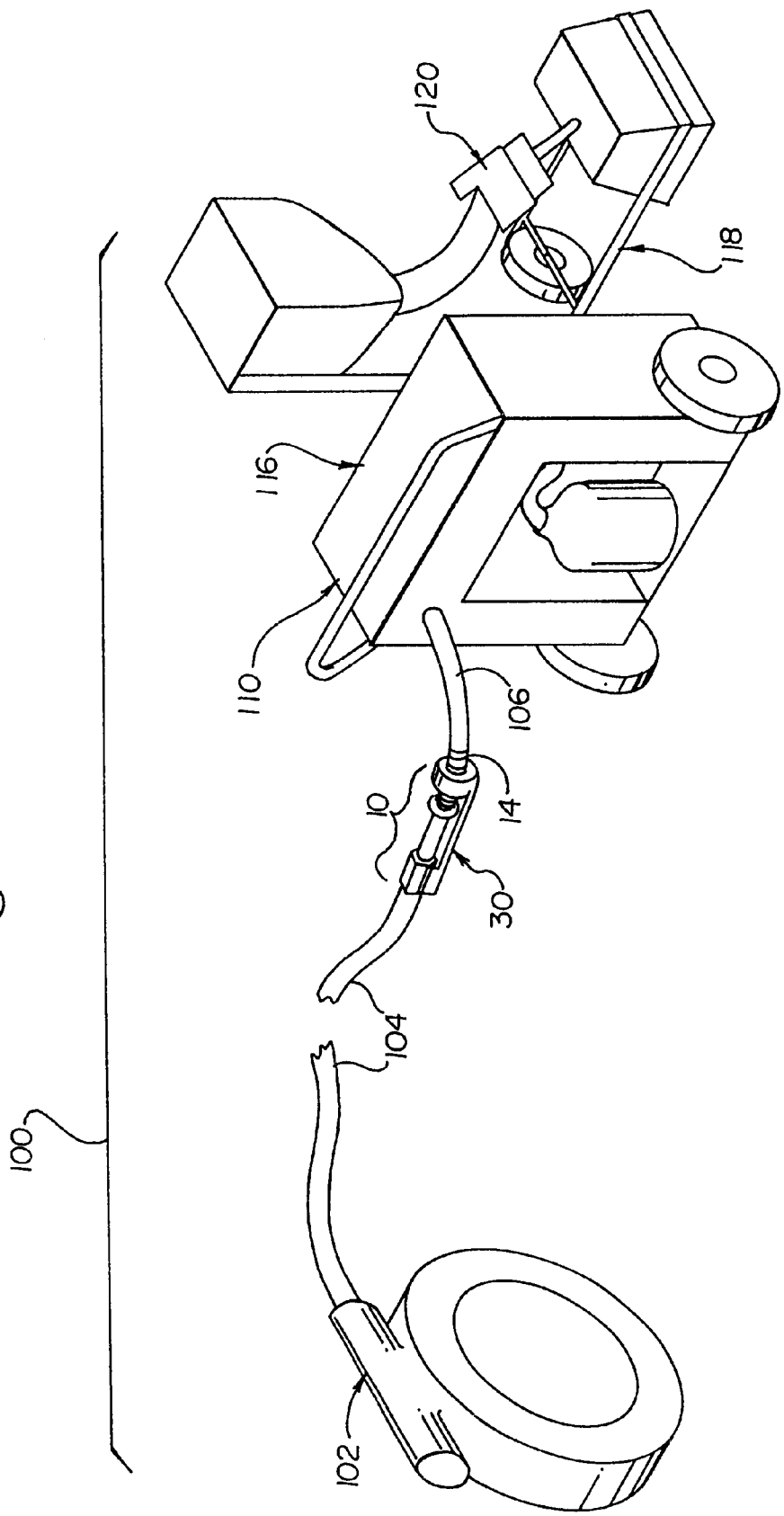
FIG. 6 shows a flame sprayer system with an example of the hose coupling of FIG. 2

FIG. 6 shows a flame sprayer system 100 including a remote compressor 102 connected to a hose 104. The hose 104 is connected to hose coupling 30. The hose coupling 30 is part of a coupling assembly 10 that also includes plug 14 and is connected to flame sprayer 110 with a hose whip 106 between the flame sprayer 110 and coupling assembly 10. The remote compressor provides a compressed air to the flame sprayer 110 through the hose 104, coupling 30, and hose whip 106. Often, the hose 104 is of a length to permit the flame sprayer 110 to travel far from the remote compressor 102.

The flame sprayer 110 rolls along the surface of a pavement and deposits a film or paint. The flame sprayer 110 includes a body portion 116, a frame 118 attached to the body portion 116, and a flame spray assembly 120 connected to the frame 118, the body portion 116, or both. In an example of operation of the flame sprayer 110, the flame spray assembly 120 mixes a fuel such as propane with compressed air from the remote compressor 102 to make a high velocity combustible gas stream. A thermal powder, often premixed with reflective glass spheres, is aspirated into the gas stream where the fuel mixture is ignited. The fuel mixture is directed toward the pavement surface. The resulting flame preheats pavement surface and deposits a film of molten thermal powder that hardens on the surface. This describes one example of a flame sprayer, and other flame sprayers suitable for use in the system 100.

If the hose 104 is inadvertently pulled with a large force, such as if the hose becomes caught on a passing vehicle, the force will pull the hose away from the flame sprayer 110. With the coupling 30 in place, longitudinal movement of the hose under the force will cause the socket 12 to disconnect from the plug 14, as described above. The hose whip 106 permits the coupling 30 to move so that sufficient forces are in the longitudinal direction to disconnect the hose coupling assembly 10. Accordingly, this arrangement reduces the amount of damage to the system 100 that would occur if the coupling 30 were not in place.

What is claimed is:

1. A hose coupling suitable for coupling to a quick disconnect male plug and to a hose, the hose coupling comprising:
    a quick disconnect female socket having a body portion with a first end and a second end, wherein the first end is adapted to receive the quick disconnect male plug and the body portion is adapted for selected coupling to the quick disconnect male plug, the quick disconnect female socket having a sleeve wherein longitudinal movement of the sleeve relative to the body portion permits decoupling of the body portion from the quick disconnect male plug;
    an end conduit adapted for coupling to the hose;
    an intermediate conduit connected to and disposed between the second end of the quick disconnect female socket and the end conduit, wherein the quick disconnect female socket and the end conduit are in fluid communication through the intermediate conduit, and wherein the intermediate conduit permits longitudinal movement of the end conduit relative to the body portion of the quick disconnect female socket; and
    a mechanical coupling connected to the end conduit and the sleeve such that a predetermined longitudinal movement of the end conduit relative to the body portion of the quick disconnect female socket effects longitudinal movement of the sleeve and disconnection of the hose coupling from the quick disconnect male plug.

2. The hose coupling of claim 1 wherein the intermediate conduit includes a female fitting having a bore for fluid communication with the quick disconnect female socket, and the end conduit includes a section inserted into the bore.

3. The hose coupling of claim 1 wherein the intermediate conduit includes a flexible tube in fluid communication with the end conduit and the quick disconnect female socket.

4. The hose coupling of claim 3 wherein the flexible tube is of a length to permit longitudinal movement of the end conduit and sleeve relative to the body portion sufficient to disconnect the hose coupling from the quick disconnect male plug.

5. The hose coupling of claim 3 wherein the flexible tube is stretchable and permits longitudinal movement of the end conduit and sleeve relative to the body portion sufficient to disconnect the hose coupling from the quick disconnect male plug.

6. The hose coupling of claim 1 wherein the mechanical coupling includes a rigid member coupled to the end conduit and the sleeve of the quick disconnect female socket.

7. The hose coupling of claim 6 wherein the rigid member is a bracket.

8. The hose coupling of claim 6 wherein the rigid member is an elongate sleeve.

9. The hose coupling of claim 1 wherein the mechanical coupling includes a stretchable member coupled to the end conduit and the sleeve of the quick disconnect female socket.

10. The hose coupling of claim 1 wherein the mechanical coupling is clamped to the sleeve.

11. A hose coupling suitable for coupling to a quick disconnect male plug and to a hose, the hose coupling comprising:
    a quick disconnect female socket having a body portion with a first end and a second end, wherein the first end is adapted to receive the quick disconnect male plug, and wherein the body portion is adapted for selected coupling to the quick disconnect male plug the quick disconnect female socket having a movable sleeve wherein longitudinal movement of the sleeve relative to the body portion permits decoupling of the body portion from the quick disconnect male plug;
    a male fitting in fluid communication with a female fitting, the male fitting having a section inserted into the female fitting for longitudinal movement within the female fitting, wherein one of the male fitting and the female fitting is connected to and proximate the body portion at the second end and the other of the male fitting and female fitting is adapted to be connected to and proximate the hose; and
    a bracket connected to the sleeve and to the other of the male fitting and female fitting wherein a predetermined longitudinal movement of the male fitting relative the female fitting effects longitudinal movement of the sleeve and disconnection of the hose coupling from the quick disconnect male plug.

12. The hose coupling of claim 11 wherein the female fitting is threaded onto the second end of the quick disconnect female plug.

13. The hose coupling of claim 11 wherein the male fitting is adapted for coupling to the hose, and wherein the bracket is connected to the male fitting.

14. The hose coupling of claim 13 wherein the male fitting is connected to a hose fitting adapted for direct coupling to the hose.

15. The hose coupling of claim 11 wherein the bracket includes a block attached to the male fitting, a clamp attached to the sleeve, and a longitudinal member attached to the block and to the sleeve.

16. The hose coupling of claim 15 and further comprising a spring directly urging the clamp toward the first end of the quick disconnect female socket.

17. The hose coupling of claim 16 wherein the spring is disposed around the quick disconnect female socket and seated proximate the second end of the quick disconnect female socket.

18. A device suitable for attachment to a quick disconnect female socket for use as a hose coupling, the device comprising:

an end conduit adapted for coupling to a hose;

an intermediate conduit adapted to be connected to a body portion of the quick disconnect female socket, the intermediate conduit connected to the end conduit and in fluid communication with the end conduit, wherein the intermediate conduit permits longitudinal movement of the end conduit relative to the body portion of the quick disconnect female socket;

a mechanical coupling connected to the end conduit and adapted to be coupled to a sleeve of the quick disconnect female socket such that a predetermined longitudinal movement of the end conduit relative to the body portion of the quick disconnect female socket effects longitudinal movement of the sleeve.

19. A hose coupling suitable for connecting to a quick disconnect male plug and a hose, the hose coupling comprising:

a quick disconnect female socket having a body portion, wherein the body portion is adapted for selected coupling to the quick disconnect male plug, the quick disconnect female socket having a locking means for selected coupling and decoupling of the body portion to the male plug;

coupling means for coupling to the hose;

means for permitting the coupling means to move relative to the body portion such that the coupling means is in fluid communication with the body portion;

means for moving the locking means relative to the body portion in connection with movement of the coupling means relative to the body portion wherein movement of the locking means relative to the body portion permits decoupling of the body portion from the quick disconnect male plug.

20. A flame sprayer system, comprising:

a flame sprayer;

an air compressor providing air through a hose;

a quick disconnect male plug connected to one of the hose and the flame sprayer; and a hose coupling connecting the flame sprayer to the hose, the hose coupling comprising:

a quick disconnect female socket having a body portion with a first end and a second end, wherein the first end is adapted for selected coupling to the quick disconnect male plug, the quick disconnect female socket having a body portion and a sleeve wherein longitudinal movement of the sleeve relative to the body portion permits decoupling of the body portion from the quick disconnect male plug;

an end conduit coupled to the hose;

an intermediate conduit connected to and disposed between the second end of the quick disconnect female socket and the end conduit, wherein the quick disconnect female socket and the end conduit are in fluid communication through the intermediate conduit, and wherein the intermediate conduit permits longitudinal movement of the end conduit relative to the body portion of the quick disconnect female socket; and a mechanical coupling,connected to the end conduit and the sleeve such that a predetermined longitudinal movement of the end conduit relative to the body portion of the quick disconnect female socket effects longitudinal movement of the sleeve and disconnection of the hose coupling from the quick disconnect male plug.

21. The flame sprayer system of claim 20 wherein the flame sprayer further includes a hose whip and the quick disconnect male plug is connected to the hose whip.

22. The flame sprayer system of claim 20 wherein the hose coupling assembly is attached directly to the hose.

* * * * *